United States Patent [19]

Scodino

[11] 3,978,892
[45] Sept. 7, 1976

[54] SELF-LOCKING PLUG APPARATUS FOR SEALING AND RECOVERING A PIPELINE LAID ON A DEEP SUBMERGED BED

[75] Inventor: Ambrogio Scodino, San Donato Milanese, Italy

[73] Assignee: Saipem S.p.A., Milan, Italy

[22] Filed: Apr. 11, 1974

[21] Appl. No.: 460,223

[30] Foreign Application Priority Data

Apr. 13, 1973  Italy................................. 22952/73

[52] U.S. Cl.................................. 138/89; 61/114; 138/90
[51] Int. Cl.² ........................................ F16L 55/10
[58] Field of Search .................. 138/89, 90, 93, 97; 61/72.3; 285/18

[56] References Cited
UNITED STATES PATENTS

| | | | |
|---|---|---|---|
| 775,124 | 11/1904 | Christman............................ | 138/89 |
| 3,483,895 | 12/1969 | Barto .................................... | 138/93 |
| 3,751,932 | 8/1974 | Matthews, Jr. ....................... | 138/93 |
| 3,842,612 | 10/1974 | Arnold................................. | 138/89 |
| 3,844,313 | 10/1974 | Arnold................................. | 138/90 |

FOREIGN PATENTS OR APPLICATIONS

| | | | |
|---|---|---|---|
| 6,500,941 | 7/1965 | Netherlands.......................... | 138/89 |
| 84,563 | 10/1935 | Sweden................................ | 138/90 |

*Primary Examiner*—Richard E. Aegerter
*Assistant Examiner*—Richard R. Stearns
*Attorney, Agent, or Firm*—Ralph M. Watson

[57] ABSTRACT

A self-locking plug, for use in the recovery of a pipeline laid on a deep submerged bed, consists of the combination of a cylindrical body having a rear section for insertion into the submerged end of the pipeline to be recovered and an ogival front end containing an exhaust port, an exhaust pipe extending along the axis of the cylindrical body from its rear end to the exhaust port, an exhaust valve, locking shoes carried by the cylindrical body, a plastic sealing ring carried in an outer groove in the cylindrical body, and means simultaneously actuated by compressed fluid carried in the ogival front end of the cylindrical body to press the locking shoes against the inner wall of the pipeline and fasten the plug to it and to force the sealing ring against the inner wall of the pipeline and prevent the flow of water around the cylindrical body.

3 Claims, 1 Drawing Figure

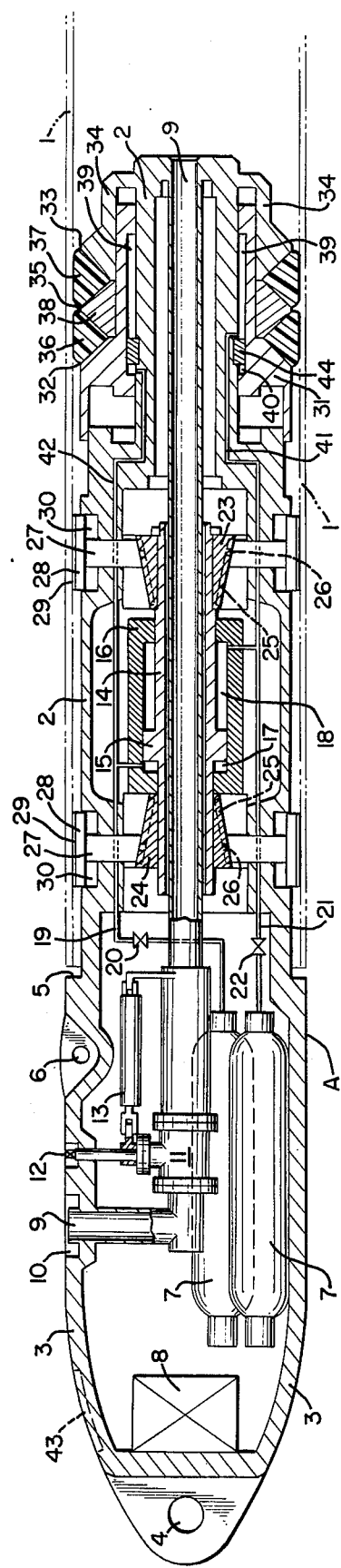

SELF-LOCKING PLUG APPARATUS FOR SEALING AND RECOVERING A PIPELINE LAID ON A DEEP SUBMERGED BED

The present invention relates to a self-locking plug apparatus which makes easy, inexpensive and quick the sealing and/or the recovery of a pipeline laid on a deep submerged bed, since said apparatus is balanced and self-contained and use is made of an effective system allowing the pipeline locking to be carried out at the same time the pipeline is sealed.

As is well known, the sealing and/or the recovery of a submerged pipeline is necessary when a pipeline rupture or other breakdown occurs during the laying of the pipeline on a submerged bed or when it is necessary to temporarily leave the pipeline on the sea-bottom because of weather conditions. It will be appreciated that said sealing and recovery operations have to be made quickly not only to minimize shut-down periods, i.e. for economy's sake, but also because sea-conditions are subject to rapid changes and the risks which always accompany human immersion in deep water. Hence the need frequently arises to make use of suitable apparatus allowing both simplicity and quickness in operation.

Now, all the apparatus known by the prior art for sealing and recovering a submerged pipeline present drawbacks both of practical and operational type and of cost.

First of all, in fact, said known apparatus do not maintain in the water a trim which will permit them to present themselves in the most propitious position for an easy introduction into the pipeline to be sealed and/or recovered and this misalignment between apparatus and pipeline involves generally the employment of several frogmen for such a long time as to weigh heavily on the cost of the operation and on the degree of safety of those frogmen. On the other hand, said known apparatus can exert only a small locking action and must present hence an outer diameter which is nearly the same as the inner diameter of the pipeline to be sealed with the consequence that the introduction of the apparatus into the pipeline is made still more difficult by the eventual presence of ovalizations at the pipeline head. The energy necessary for the working of the known apparatus is delivered by a source located on a floating vessel and it is transmitted to the apparatus by means of cables or hoses, which involves a greater difficulty in maneuvering the apparatus and consequently a greater cost due to the longer time required for the connection of the hoses, the presence of which also subjects the system to the sea-conditions.

According to the prior art, the locking of the known apparatus into the pipeline to be sealed and/or recovered and the sealing between said apparatus and said pipeline are furthermore carried out separately by means of distinct mechanisms entailing a complicated and unsatisfactory mode of installation, since their installation, besides requiring a greater number of control and energy devices involving constructional complications in the apparatus and a considerable time for the execution of the operations, requires the employment of several frogmen, which is prejudicial to the economy of the system.

Finally, it is to be borne in mind that the apparatus known by the prior art for sealing and recovering a submerged pipeline has always required devices for emptying the said pipeline, said emptying operation being always required when the pipeline has to be recovered and said devices ordinarily consist of a vacuum chamber, wherein an emptying ball is located, and control and guide means for injecting compressed air upstream of the said ball.

In other words, according to the prior art, the emptying operation is made by delivering compressed air from a floating vessel into a pipe located inside the pipeline closing apparatus so that a ball located in a vacuum chamber of the same apparatus is pushed by the said compressed air along the pipeline and so ejects the water contained in the pipeline towards the other pipeline end located on the shore. It will be now clear such a method involves various drawbacks both of practical and economic type and of an operational nature. The presence, in fact, of a vacuum chamber for housing a ball, of said ball and of the control and guide means for compressed air complicates much both the working and the construction of the closing apparatus. The greater the number of connections to the floating vessel by means of hoses subjects the system to the hazards of sea-conditions for unduly long periods and also requires a longer time of dangerous immersion for the frogmen. Finally, since the emptying ball is contained in the closing apparatus which in its turn is inserted into the pipeline to be sealed, said ball, after it is passed into the said pipeline, will not adhere perfectly, given the difference between the inner diameters of the apparatus and of the pipeline, to the inner wall of said pipeline so as to produce an effective sealing and hence an effective and economic emptying which will be obtained only with a greater waste of energy to compensate for the leakages.

An object of the present invention is to eliminate the afore-said drawbacks and to provide hence an apparatus or plug for sealing and/or recovering a submerged pipeline, which is self-contained as to energy requirements, i.e. it incorporates hydropneumatic accumulators supplying the energy necessary for the operation so as to eliminate the hoses connected to the floating vessel, is balanced in such a way to easily assume the longitudinal trim suitable for an easy introduction of said plug into the pipeline by means of a single frogman; and is provided with radially shiftable locking and sealing mechanisms which can be simultaneously operated in a safe and easy way by a single control level and are able to exercise a considerable radial action so that the said plug may have a diameter relatively much smaller than that of the pipeline wherein the plug has to be inserted, with the consequence that said introduction of the plug is made very easy, even in the case of an ovalization of the head of the pipeline.

On the other hand, with the self-locking plug of the present invention, the emptying operation of the pipeline to be recovered is now obtained by ejecting the water contained in the pipeline through the selflocking plug itself, instead of ejecting said water from the pipeline end located on the shore as practiced through the prior art, the emptying ball being pushed towards the same plug by the compressed air supplied by a source located on the shore. Thus, besides reducing remarkably the cost and the risks of the emptying operation, since the compressed air is now supplied by a source located on the shore and the system is not subjected to the sea-conditions, making said operation very effective, since the emptying ball adheres perfectly to the inner wall of the pipeline as said ball is inserted directly into the pipeline at the pipeline end located on the shore. There is also a remarkable simplification in the construction of the selflocking plug, since said plug need no longer present a vacuum chamber for housing the emptying ball and the relevant control means, but only an exhaust pipe with the relevant on-off valve.

Summing up, the apparatus or self-locking plug according to the present invention is constituted by a cylindrical body which is to be inserted into the pipeline to be sealed, ends in an ogival front head and contains in its middle longitudinal zone an exhaust pipe intercepted by a manually or hydropneumatically operable on-off valve and having an outlet port located on a side of the said ogival front head of the plug. The mechanisms for locking and sealing the plug into the said pipeline, as well as the hydropneumatic accumulators supplying the energy necessary to operate the said mechanisms, are located inside that same plug, which has an outer diameter that is relatively much smaller than the inner diameter of the pipeline to be sealed and whose ogival front head contains a balancing chamber adapted to balance the plug with respect to its connecting point to a rope or cable of a floating vessel so as to dispose and keep said plug along a longitudinal trim.

According to another distinctive feature of the invention, the mechanism for locking the plug into the pipeline to be sealed comprises a double set of shoes radially shiftable against the inner wall of the pipeline by means of two sets of wedges connected to said shoes through a dovetail joint allowing the longitudinal sliding of the wedges with respect to the said shoes, the two sets of wedges being integral with two sliders respectively, which telescopically slide in the longitudinal direction along the said exhaust pipe and define between them two expanding chambers connected to said hydropneumatic accumulators through control valves. According to a further distinctive feature of the invention, the mechanism for sealing the self-locking plug into the pipeline comprises two plastic, toroidally-shaped sealing rings which, together with a metallic, triangularly-shaped ring sliding freely in longitudinal direction and separating the said plastic rings from each other, are housed in a peripheral, trapezoidally-shaped recess having a variable width defined by an inclined wall of the rear end of the same plug and by an inclined, movable wall of a slider telescopically sliding in the longitudinal direction on the body of said plug and defining with said body two expanding chambers directly connected to the said corresponding expanding chambers defined by the two said wedge sliders, so that a single control can carry out at the same time both the locking of the self-locking plug to the pipeline and the sealing of said pipeline. According to a preferred embodiment of the invention, on the arched surfaces of the said locking shoes there are then indented notches for increasing the adhesion between the said surfaces and the inner surface of the pipeline and the said control valves for sending the hydraulic pressure of the said accumulators into either of the said expanding chambers and the said on-off valve of the exhaust pipe are remotely operated only by two levers located on a control panel fixed on the said ogival front head of the selflocking plug.

The invention will now be illustrated in the accompanying drawing, which is a merely exemplary and non-limiting embodiment, since the adoption of constructional techniques or equivalent members different from those described herein lies within the scope of the present invention.

BRIEF DESCRIPTION OF THE DRAWING

The drawing is a longitudinal, sectional view of a self-locking plug for sealing and recovering a submerged pipeline according to my invention, wherein the plug is located inside a pipe in its locking and sealing position.

In said drawing, reference numeral 1 indicates the pipeline to be sealed and recovered, and wherein the cylindrical body 2 of the selflocking plug A is to be inserted. Said body ends in its front part with an ogival head 3 having at its front a hole 4 for hooking a steel cable used to recover the plug-pipeline system and at its rear a shoulder 5 acting as a stop for the end edge of the same pipeline 1. Another hole 6 is provided on the upper part of the head 3, near the said shoulder 5, for hooking the steel cable used to lower the plug from the floating vessel to the sea-bottom near the pipeline, said hole being made in the same body of the head so that no projecting parts are present. Inside head 3 there are then hydropneumatic accumulators 7 supplying the energy necessary to operate the plug mechanisms, and a balancing chamber 8 which is more or less filled with water or other ballast for balancing the plug A with respect to its hooking hole 6 so as to dispose and keep said plug according to a longitudinal trim suitable for an easy introduction of said plug into the pipeline. Cylindrical body 2 is passed through the whole length of its central zone by an exhaust pipe 9 having its outlet port 10 recessed into the upper part of head 3. Said exhaust pipe is kept open or closed by an on-off valve 11 which is operable either manually by means of a handwheel acting on the valve stem 12 or automatically by means of hydraulic cylinder 13 operated by the energy delivered by accumulators 7.

In correspondence of the middle part of cylindrical body 2 and inside said body there is then located the mechanism for locking the plug A into the pipeline 1. Said locking mechanism comprises a cylidrical slider 14 mounted for longitudinal sliding movement along the exhaust pipe 9 and presenting a collar 15 cooperating with the inner wall of another cylindrical slider 16 mounted for longitudinal sliding movement along the first slider too, to define two expanding chambers 17 and 18 respectively, which are connected to the accumulators 7 through the duct 19 and the control valve 20 and the duct 21 and the control valve 22 respectively. A set of wedges 23 (only two opposed wedges are shown in the drawing) is rigidly fixed to slider 14, said wedges being angularly spaced from each other, while a similar set of wedges 24 is rigidly fixed to slider 16, the two sets of wedges being opposed to each other with respect to the variable thickness of their wedges. Each wedge 23 or 24 is provided with a dovetail-shaped longitudinal groove 25 acting as a guide for the coupling pin 26 of a plunger 27 which projects radially from the plug A through a guiding hole in the cylindrical body 2, and supports at its free end a shoe having an arched surface. In such a way the wedges and consequently their sliders may slide in the longitudinal direction whereas the cylinders and consequently the shoes are obliged to radially shift owing to their dovetail joint with the said wedges.

The working of such a locking mechanism will be clear at once. When control valve 22 is opened and the hydraulic pressure of accumulators 7 is hence sent into the expanding chamber 18, the slider 15 with the set of wedges 23 is moved to the left whereas the slider 16 with the set of wedges 24 is moved to the right. Plungers 27 are consequently forced outwardly from the cylindrical body 2 and cause their shoes to strongly adhere against the inner wall of pipeline 1. In such a way plug A is locked into the said pipeline the (positioin shown in the drawing). Furthermore, in order to increase still more the said adhesion between the shoes and the inner wall of the pipeline and to make more and more effective the said locking, the arched surfaces of the shoes are not smooth but are indented with notches 29. When, on the contrary, control valve 20 is opened, the sliders and the wedges are moved in the opposite directions from the foregoing ones and the shoes 28 go back into the relevant housings 30 on the cylindrical body 2, thus releasing the self-locking plug A.

The mechanism for sealing plug A into pipeline 1 is located at the rear end of the cylindrical body 2 and comprises a cylindrical slider 31, which is mounted for sliding movement on the said body 2, and defines between its inclined wall 32 and a similarly inclined wall 33 of the end part 34 of the cylindrical body 2 a peripheral, trapezoidally-shaped recess 35 having a width which varies according to the position of the movable slider 31. In said recess there are two plastic, toroidally-shaped sealing rings 36 and 37 which are separated from each other by a metallic, triangularly shaped ring 38 mounted for sliding movement on the said slider 31. Slider 31 and body 2 form an inner cavity, subdivided by a ring 44 fixed to said body 2 into two expanding chambers 39 and 40. Said expanding chambers 39 and 40 are connected through ducts 41 and 42 to the said expanding chambers 18 and 17 respectively, so that a single control on the valve 22 or 20 makes it possible to carry out at the same time both the locking and the sealing or vice versa. In fact, when control valve 22 is opened, the hydraulic pressure of accumulators 7, besides entering expanding chamber 18 and causing the radial shifting of shoes 28 and hence the locking of plug A inside pipeline 1 as described above, enters also expanding chamber 39 and obliges slider 31 to move to the right. In this way the width of the trapezoidally shaped recess 35 becomes narrower and narrower and plastic rings 36 and 37 are radially shifted and pushed against the inner wall of the pipeline by the inclined walls of the triangularly shaped ring 38 and by the inclined walls 32 and 33 respectively, so that a sealing is obtained.

Now, since the locking of the selflocking plug A inside pipeline 1 and the sealing of said pipeline are obtained by means of mechanisms allowing a considerable radial shifting of the locking elements (shoes 28) and of the sealing elements (plastic rings 36 and 37), it will be clear that cylindrical body 2 of plug A may have an outer diameter which is relatively much smaller than the inner diameter of pipeline 1. This fact, together with the fact said plug A is always kept along a longitudinal trim as described above makes very easy the introduction of the plug into the pipeline, even in the case of an ovalization of the head of the pipeline, by means of a single frogman. On the other hand the work of this single frogman is made still easier by the fact the set of control valves 20 and 22 and the control valve (not shown in Figure) for sending the hydraulic pressure of accumulators 7 into the hydraulic cylinder 13 operating the on-off valve 11 of the exhaust pipe 9 are remotely operated each by a two-position lever, the said two levers being located on a control panel 43 fixed on the said ogival front head 3, i.e. in an easily accessible position.

What I claim is:

1. A self-locking plug for use in the recovery of a pipeline laid on a deep submerged bed, comprising the combination of a cylindrical body member having a rear section adapted to be inserted into the submerged end of the pipeline to be recovered and a hollow ogival front end containing a hole adjacent its rear for the reception of a suspension hook and also containing an exhaust port, an exhaust pipe extending along the axis of the cylindrical body member from its rear end to the exhaust port, an exhaust valve for controlling the flow of water through said exhaust pipe and exhaust port, locking means including shoes carried by the cylindrical body member and means for forcing said shoes against the inner wall of said pipeline to anchor the plug into the pipeline, sealing means including a plastic ring seated in a groove in the outer wall of the cylindrical body member and means for squeezing said plastic ring so that it is forced against the inner wall of the pipeline to prevent the flow of water through the pipeline around the plug, compressed fluid carried in container means located in said ogival end, conduits respectively connecting said container means with the locking means and the sealing means, and valves located in said conduits for regulating the admission of compressed fluid to the locking means and the sealing means, said ogival end having a balancing chamber adjacent its front adapted to contain sufficient water to maintain the axis of the cylindrical body member along a substantially horizontal plane when the plug is suspended at a point coinciding with said hole in the ogival end.

2. A self-locking plug as claimed in claim 1, wherein the locking means include a set of radial plungers extending through guide holes in the side of the cylindrical body member, each of said plungers having one of said shoes mounted on its outer end, a cylindrical slider mounted for sliding motion on said exhaust pipe, a set of radially extending, longitudinally oriented wedges carried by said slider each wedge having guide means on the outer surface thereof, the inner ends of each plunger being operatively connected to the guide means of an associated wedge wherein the plungers are forced outwardly when the slider moves in one direction and are drawn inwardly when the slider moves in the opposite direction, and a pair of expanding chambers operatively connected to said slider and connected with said compressed fluid container means by said conduits so that admission of the fluid into one of said chambers causes the slider to move in one direction causing the wedges to move the plungers outwardly and force the shoes against the inner wall of the pipeline and admission of the fluid into the other chamber causes the slider to move in the opposite direction causing the plungers to move inwardly so that the shoes are housed in associated recesses provided in the outer wall of the cylindrical body member.

3. A self-locking plug as claimed in claim 1, wherein the sealing means includes a cylindrical slider mounted for sliding motion on a recessed portion of said cylindrical body member and having a part forming one edge of the groove containing said plastic ring, a stationary shoulder projecting from the cylindrical body member above said recessed portion to form the other edge of said groove so that movement of that slider in a direction away from said shoulder enlarges the diameter of said groove and movement of that slider in the opposite direction decreases the diameter of said groove, and a pair of expansion chambers operatively connected to said cylindrical slider and connected with said compressed fluid container means by said conduits so that admission of the fluid into one of said chambers causes the cylindrical slider to move in one direction and decrease the diameter of said groove, thereby squeezing the plastic ring and forcing it against the inner wall of the pipeline, and admission of the fluid into the other of said chambers causes the cylindrical slider to move in the opposite direction and increase the diameter of said groove to relax the plastic ring.

* * * * *

UNITED STATES PATENT AND TRADEMARK OFFICE
CERTIFICATE OF CORRECTION

PATENT NO. : 3,978,892
DATED : September 7, 1976
INVENTOR(S) : Ambrogio Scodino

It is certified that error appears in the above-identified patent and that said Letters Patent are hereby corrected as shown below:

Col. 1, line 14, correct "is" to read -- are --;

line 32, after "maintain" delete "in the water" and after "trim" insert -- in the water --.

Col. 2, line 21, after "greater" delete "the".

Col. 5, line 7, delete "the (positi-" and insert

-- (the posi- --;

line 8, correct "oin" to read -- tion --;

line 22, before "sliding" insert -- longitudinal --;

line 30, before "sliding" insert -- free --.

UNITED STATES PATENT OFFICE
CERTIFICATE OF CORRECTION

Patent No. 3,978,892            Dated September 7, 1976

Inventor(s) Ambrogio Scodino

It is certified that error appears in the above-identified patent and that said Letters Patent are hereby corrected as shown below:

Column 6, line 20, "into" should read -- to --.
           line 44, after "slider" insert a -- , --.

Signed and Sealed this

Thirty-first Day of May 1977

[SEAL]

Attest:

RUTH C. MASON
*Attesting Officer*

C. MARSHALL DANN
*Commissioner of Patents and Trademarks*